United States Patent [19]
Jabaji

[11] Patent Number: 5,907,233
[45] Date of Patent: *May 25, 1999

[54] VOLTAGE REGULATOR WITH IMPROVED FIELD COIL CURRENT CONTROL SYSTEM AND WARNING SYSTEM

[75] Inventor: Issam Jabaji, Skokie, Ill.

[73] Assignee: C.E. Niehoff & Co., Evanston, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/880,976

[22] Filed: Jun. 23, 1997

[51] Int. Cl.⁶ ........................................................ H02H 7/06
[52] U.S. Cl. .............................. 322/28; 323/283; 323/284
[58] Field of Search .................................. 322/28, 99, 22; 323/283, 284

[56] References Cited

U.S. PATENT DOCUMENTS

| | | | |
|---|---|---|---|
| 4,379,990 | 4/1983 | Sievers et al. | 322/99 |
| 4,419,619 | 12/1983 | Jindrick et al. | |
| 4,634,954 | 1/1987 | Kato et al. | |
| 4,636,706 | 1/1987 | Bowman et al. | |
| 4,651,081 | 3/1987 | Nishimura et al. | 320/123 |
| 4,659,977 | 4/1987 | Kissel et al. | |
| 4,670,705 | 6/1987 | Sievers et al. | |
| 4,789,817 | 12/1988 | Asakura et al. | |
| 4,992,951 | 2/1991 | Glowczewski et al. | |
| 5,216,350 | 6/1993 | Judge et al. | |
| 5,225,764 | 7/1993 | Falater. | |
| 5,260,641 | 11/1993 | Iwatani. | |
| 5,272,614 | 12/1993 | Brunk et al. | |
| 5,491,404 | 2/1996 | Settles et al. | |
| 5,512,813 | 4/1996 | Uchinami | 322/28 |

OTHER PUBLICATIONS

SAE Tech Paper, James Becker, Mahmood Poukermani, and Eskandar Saraie "Dual Voltage Alternators", C.E. Niehoff & Co., Nov. 18, 1962, pp. 1–3.

*Primary Examiner*—Shawn Riley
*Attorney, Agent, or Firm*—Brinks Hofer Gilson & Lione

[57] ABSTRACT

A microprocessor-based voltage regulator for an alternator reduces battery drain by removing current from the field coil during times when the alternator is not rotating, as indicated by an AC Sense signal responsive to one of the windings of the alternator prior to rectification. The field coil switch is controlled by the microprocessor to one of four duty cycles to provide effective voltage regulation with a minimum of additional hardware. The microprocessor generates a warning signal in the event of a non-standard operating condition such as drifting voltage regulation, disconnected batteries, or thermal limits that approach shut down.

17 Claims, 8 Drawing Sheets

Microfiche Appendix Included
(1 Microfiche, 28 Pages)

Fig. 1

VOLTAGE REGULATOR WITH IMPROVED FIELD COIL CURRENT CONTROL SYSTEM AND WARNING SYSTEM

REFERENCE TO MICROFICHE APPENDIX

The specification includes a microfiche appendix including 1 microfiche and 28 frames.

BACKGROUND OF THE INVENTION

This invention relates to a voltage regulator suitable for use with a generator such as an alternator, and in particular to a voltage regulator that provides improved control functions.

FIG. 9 shows a prior-art dual voltage alternator A that supplies output currents to two separate buses, a 28 volt bus and a 14 volt bus in this example. This alternator is suitable for use in a dual battery system that uses a first battery B1 interposed between ground and the 14 volt bus and a second battery B2 interposed between the 14 volt bus and the 28 volt bus.

In the conventional manner, the alternator A includes a field coil F and two sets of stator windings W. The stator windings W are connected by rectifying diodes D to the 28 volt bus, and the stator windings W are also connected to the 14 volt bus by winding switches such as SCR's S. Conventionally, the alternator A is controlled by a voltage regulator (not shown in FIG. 9) that controls current through the field coil F to regulate voltage on the 28 volt bus, and that controls the winding switches S to regulate voltage on the 14 volt bus.

In the past, voltage regulators have been constructed both as analog and as digital circuits, in some cases including microcomputers. See, for example, Kissel, U.S. Pat. No. 4,659,977, and Judge, U.S. Pat. No. 5,216,350. Falater, U.S. Pat. No. 5,225,764 discloses a digital voltage regulator that employs a duty cycle generator to vary the duty cycle of a field coil switch.

In spite of this work, a need presently exists for an improved voltage regulator that is both effective in operation and inexpensive in construction.

SUMMARY OF THE INVENTION

The present invention is defined by the following claims. Without intending any limitation on these claims, it can be said here that the improved voltage regulator described below performs a number of important functions. These functions are preferably performed in combination as described below, but each can be used separately of the others.

A first function described below relates to the manner in which the regulator monitors an AC signal associated with a stator winding to determine when the generator is rotating and operating properly. In this way field coil current can be interrupted when the generator is not rotating to reduce battery drain and to prevent damage to an energized alternator field coil.

A second function described below relates to the manner in which software in a digital processor included in the voltage regulator generates a switch control signal that switches the field coil switch on and off with a variable duty cycle. By using a clock signal associated with the digital processor, an appropriate duty cycle is obtained without the need for a separate pulse width modulation circuit. By limiting the number of intermediate duty cycle levels to four, an effective voltage regulator is provided that minimizes control problems such as hunting, a low frequency voltage oscillation about a voltage reference.

A third function described below relates to the manner in which software in the digital processor included in the voltage regulator generates a warning signal when a non-standard operating condition of the alternator or the voltage regulator is detected. This warning signal is also activated if extreme operating conditions of the alternator or the voltage regulator develop which may lead to component failure. The warning signal can be used to advise an operator that the electrical supply system is approaching an excessively high temperature condition, a drifting regulated voltage condition, or an excessive ripple voltage condition, for example. The operator can then take appropriate action, which may avert component failure.

DETAILED DESCRIPTION OF THE PRESENTLY PREFERRED EMBODIMENTS

Figure 1:
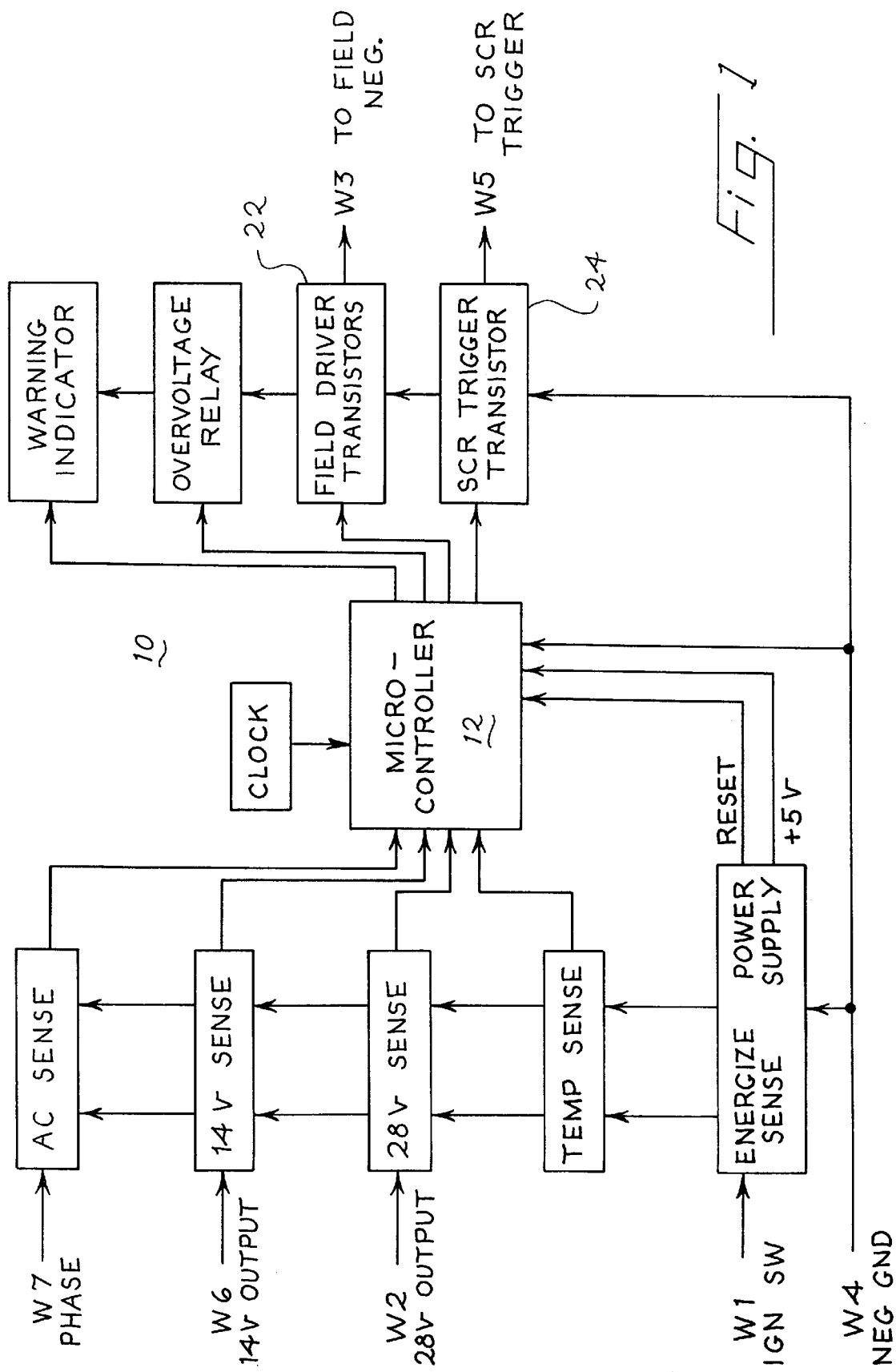
FIG. 1 is a block diagram of a voltage regulator that incorporates a preferred embodiment of the present invention.

Turning now to the drawings, FIG. 1 provides a block diagram of a voltage regulator 10 that operates in accordance with this invention. The voltage regulator 10 includes a micro-controller 12 that executes a set of software routines at a rate determined by a clock signal generated by a clock 14. The micro-controller 12 includes a digital processor, an analog to digital converter, suitable memories, and may be any suitable micro-controller. For example, the micro-controller offered by Motorola as Part No. MC 68HC11 has been found suitable.

Figure 9:
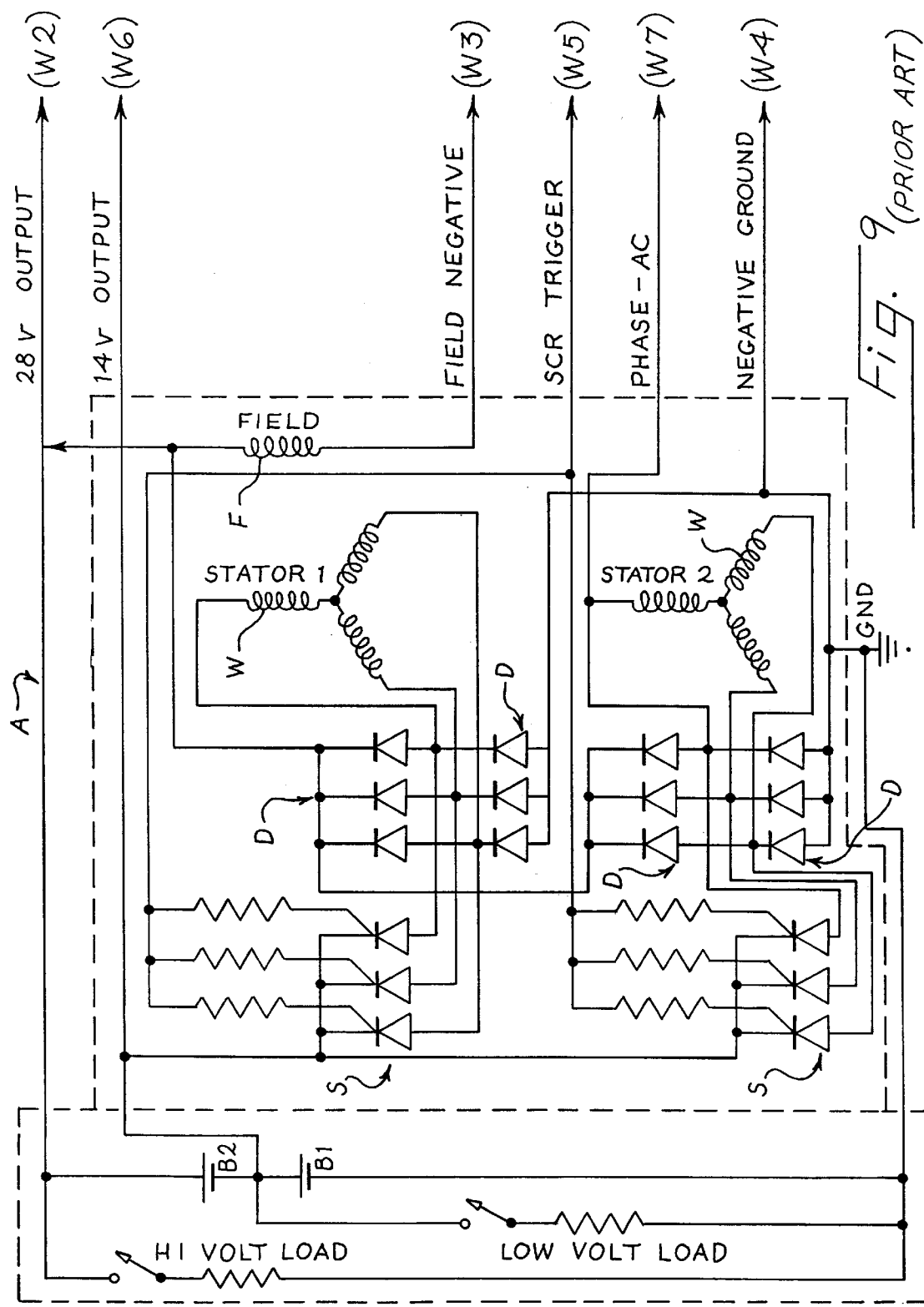
FIG. 9 is a schematic diagram of a prior-art alternator suitable for use with this invention.

The voltage regulator 10 of FIG. 1 has been adapted for use with the alternator A shown in FIG. 9. The input signals to the micro-controller 12 are shown at the left hand side of FIG. 1, and the output signals generated by the micro-controller 12 are shown at the right hand side of FIG. 1.

With respect to input signals, the micro-controller 12 receives four analog input signals as follows:

AC Sense—The input signal AC Sense is responsive to the AC output voltage provided by one of the stator windings W prior to rectification. The signal AC Sense is thus an alternating voltage that is present whenever the alternator is rotating and adequate current is flowing through the field coil F of FIG. 9.

14V Sense—This signal is an analog voltage proportional to the voltage of the 14 volt bus.

28V Sense—This signal is an analog voltage proportional to the voltage of the 28 volt bus.

Temp Sense—Temp Sense is an analog voltage proportional to ambient temperature as measured by a temperature-responsive device included in the regulator 10.

Figure 2:
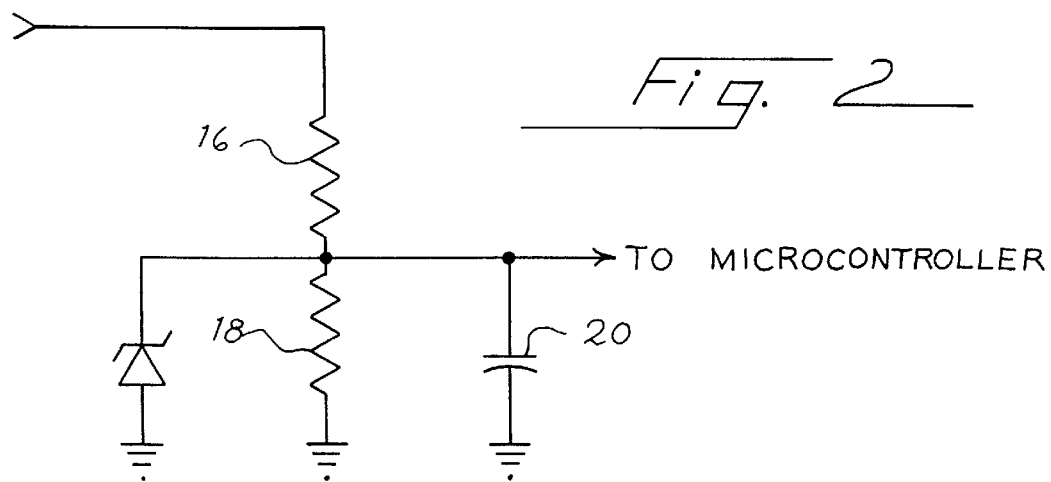
FIG. 2 is a schematic diagram of a sense circuit included in the embodiment of FIG. 1.

FIG. 2 shows a schematic diagram of the basic circuitry suitable for use for each of the sense circuits described above other than Temp Sense. As shown in FIG. 2, each sense circuit includes a voltage divider made up of resistors 16, 18. The input signal to the micro-controller is taken from the node between the resistors 16, 18. A capacitor 20 averages the fluctuations in this input signal and a Zener diode protects the analog input from high transient voltage. The resistors 16, 18 and the Zener diode are selected to ensure that the input signal to the micro-controller remains within the desired voltage range, suitable for use as an analog input to the micro-controller 12.

The reset input of the micro-controller 12 is also responsive to an energize sense circuit that is in turn responsive to the ignition switch of the vehicle in which the alternator is mounted.

The micro-controller 12 generates control signals for two sets of transistors. The first is a set of field driver transistors 22 that control the field current flowing through the field coil F of FIG. 9. The field driver transistors 22 are operated as on/off field coil current switches. The micro-controller 12 also controls a second set of SCR trigger transistors 24, that are in turn coupled to the trigger input of the SCR's S of FIG. 9. By controlling the duty cycle of the field driver transistors 22, the micro-controller 12 controls the average field coil current to the field coil F, and thereby the power produced by the alternator by maintaining the regulated voltage on the 28 volt bus. The micro-controller 12 controls the voltage on the 14 volt bus by controlling the SCR trigger transistors 24. The micro-controller 12 also controls an over voltage relay and a warning indicator light.

Figure 3:
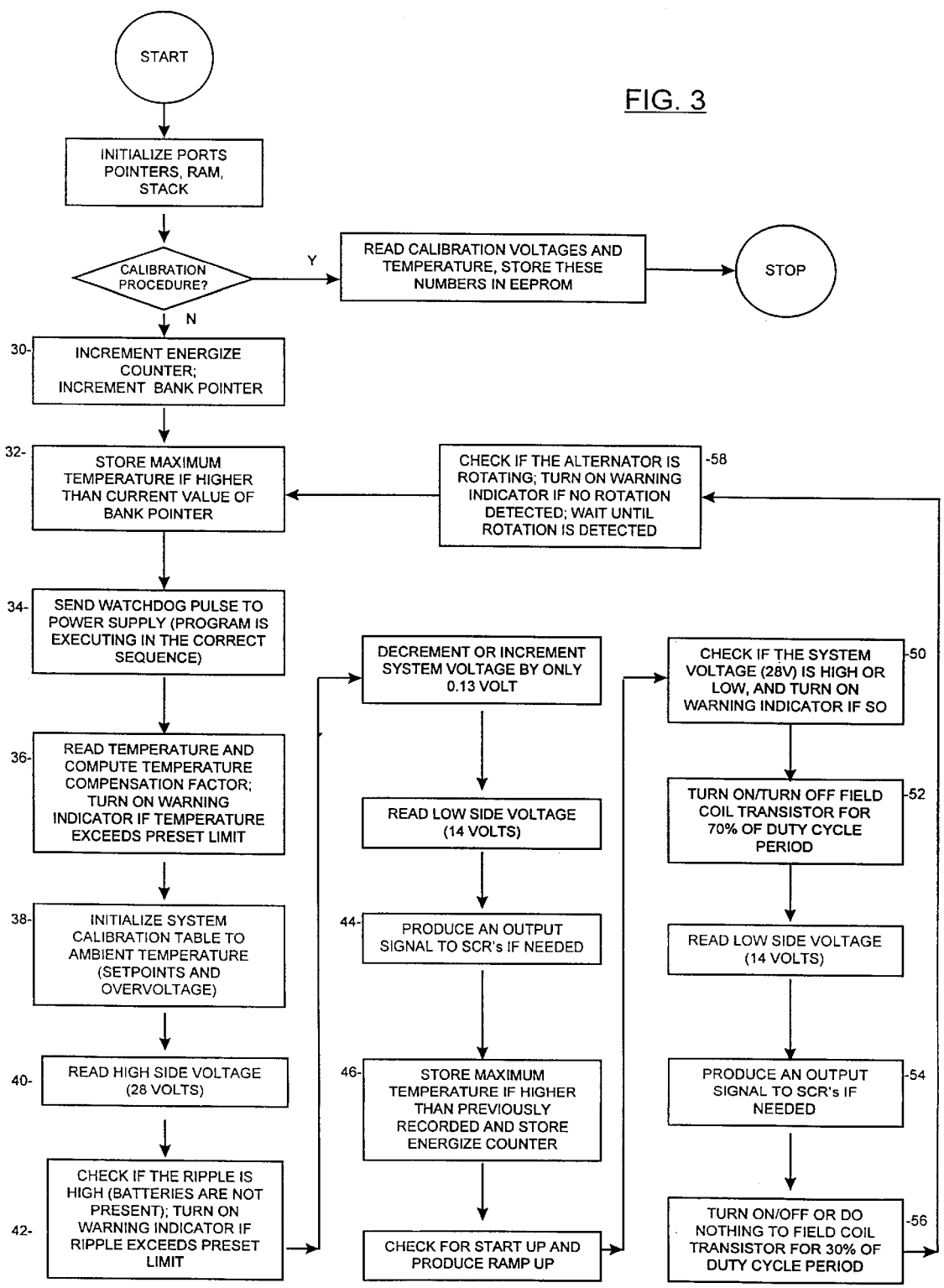
FIGS. 3 through 7 are flow charts of software routines executed by the micro-controller of FIG. 1.

FIGS. 3 through 7 define the basic operation on the software routines that are executed by the micro-controller 12. The flow chart of FIG. 3 shows the overall flow of the program, and the flow charts of FIGS. 4 through 7 detail selected subroutines shown in FIG. 3.

As shown in FIG. 3, when the Energize Sense circuit initiates operation of the micro-controller 12 in response to activation of the ignition switch of the vehicle, the micro-controller is initialized, and then an energize counter and a bank pointer are incremented in block 30. The energize counter thereby maintains a count of the total number of times the voltage regulator has been energized. The bank pointer addresses an internal memory of the micro-controller 12, that is used to store the maximum temperature measured by the voltage regulator during the respective energization. Repeatedly during operation, as for example in block 32, the routine checks the temperature from the Temp Sense circuit and stores the new temperature in the memory addressed by the bank pointer in the event the newly measured temperature is higher than the previously stored temperature.

Next a watchdog pulse is sent in block 34 to the power supply to indicate that the program is executing in the proper sequence. If the watchdog pulse fails to appear as expected, the power supply resets the micro-controller 12. This protection is important to maintain control of the system by the micro-controller 12, which executes its program continuously.

Next, the routine reads the temperature from the Temp Sense circuit and computes a temperature compensation factor in block 36. Also, the warning indicator is turned on if the measured temperature exceeds a preset limit. As is well known, appropriate voltage regulation set points and overvoltage protection points vary as a function of ambient temperature. The routine then determines appropriate set points and overvoltage limits in block 38 as a function of the measured ambient temperature. For example, the micro-controller can use a look-up table or a stored algebraic relationship to determine a set point SPL and an overvoltage limit OVL as a function of the measured ambient temperature. Once SPL and OVL have been determined, a number of algebraically related set points can be determined as follows:

SPH=SPL+0.13 volts;
SPH1=SPL+0.26 volts;
SPH2=SPL+1.17 volts;
SPL3=SPL−0.91 volts;
SPL2=SPL−0.65 volts;
SPL1=SPL−0.13 volts.

Once the set points have been determined, the system then reads the high side voltage as measured by the 28V Sense circuit and checks the ripple level of the input signal provided by the 28V Sense circuit. If the ripple level is high, this is taken as an indication that batteries are not present in system, and an appropriate flag is set in block 42 to turn on the warning indicator. The ripple is determined by finding the difference between the present voltage and a previously read voltage.

The routine then sets a parameter (System Voltage) in block 42 as a function of the measured input signal supplied by the 28V Sense circuit. In particular, System Voltage is incremented by a set amount if the recently read voltage is greater than the previous value of System Voltage, and System Voltage is decremented if the recently read value from the 28V Sense circuit is less than the previous value of System Voltage.

Figure 4:
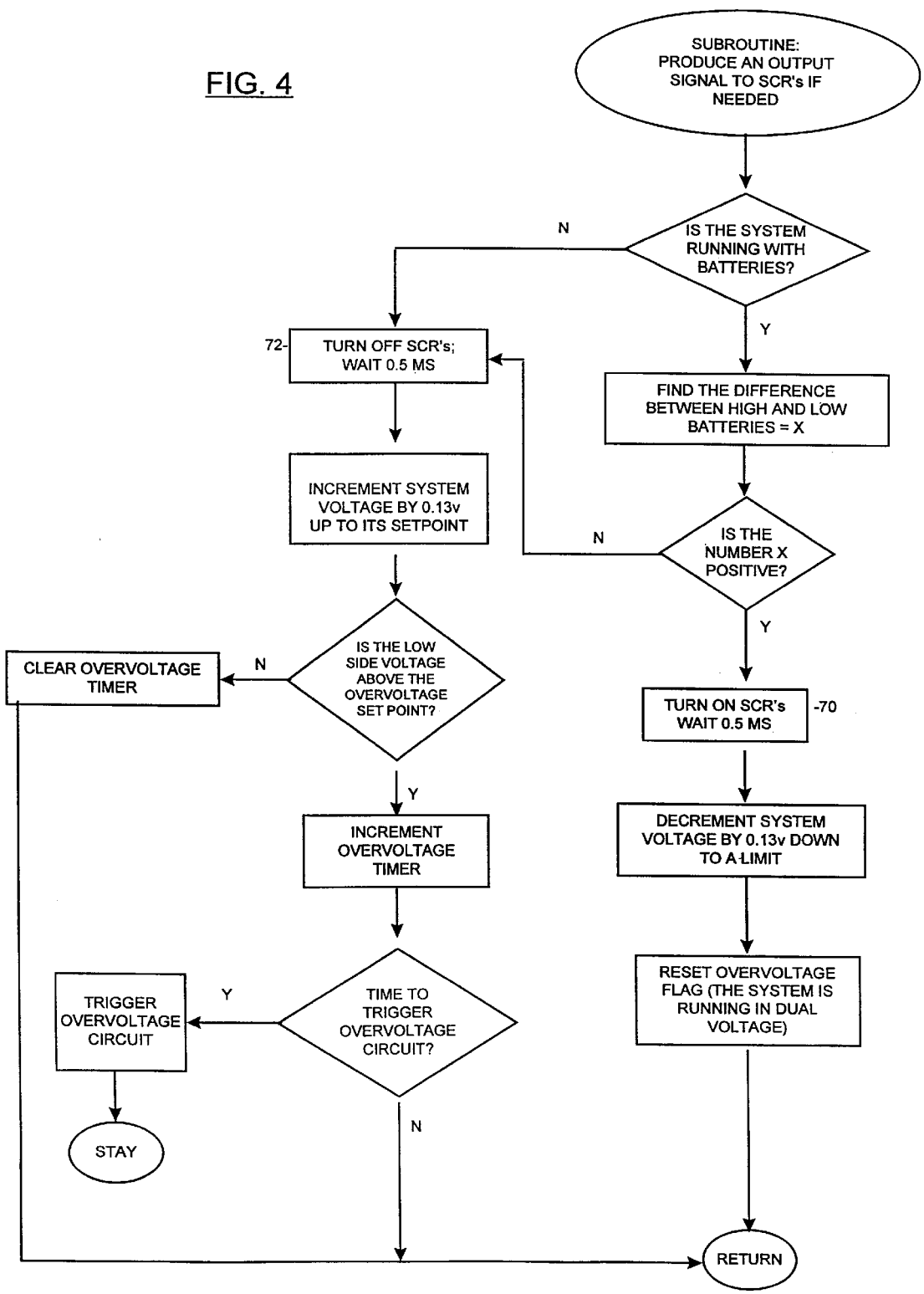

The routine then reads the voltage of the 14 volt bus by digitizing the input signal supplied by the 14V Sense circuit, before transferring control in block 44 to the subroutine of FIG. 4. This subroutine controls the SCR trigger transistors 24 of FIG. 1.

As shown in FIG. 4, if the system is running with batteries and the voltage of the 14 volt bus is less than half the voltage of the 28 volt bus, then the SCR's S are turned on in block 70. Then the routine waits for 0.5 milliseconds, decrements System Voltage by 0.1 volt as long as System Voltage is greater than a limit such as 27.2 volts, resets the overvoltage flag and returns. If the 14 volt system is running without batteries, or the 14 volt bus is more than 50% the value of the 28 volt bus, then the SCR's S are turned off in block 72. After a delay of 0.5 milliseconds, System Voltage is incremented if it is below its set point SPL, and the low side voltage is compared to the overvoltage set point. As long as the low side voltage is below the overvoltage set point, the overvoltage timer is cleared and the routine returns. Otherwise the overvoltage timer is incremented and then checked. If the overvoltage timer has exceeded a preset limit, the overvoltage circuit is triggered, which causes the voltage regulator to shut down and to remain in this state until the regulator is reset by turning the ignition switch off and then on again. If it is not yet time to trigger the overvoltage circuit, the routine returns.

Returning to FIG. 3, control then passes to block 46, which stores a new maximum temperature in memory if the current temperature is higher than the highest previously recorded temperature. In addition the energize counter will be stored to identify the period in which this high temperature was recorded.

The routine then checks to determine if the ignition switch has only recently been energized. If so, this is taken as a condition that the engine driving the alternator is being started, and the field current transistors 22 of FIG. 1 are maintained in the off condition for a selected period and then gradually ramped up in duty cycle. In this way both the engine load and the battery drain required to supply field coil current are eliminated when the engine is being started.

Control then passes to block 50 which checks to see if the System Voltage is lower than SPL3 or higher than SPH2 and turns on the warning indicator if so. Control is then transferred at block 52 to the subroutine of FIG. 5.

Figure 5:
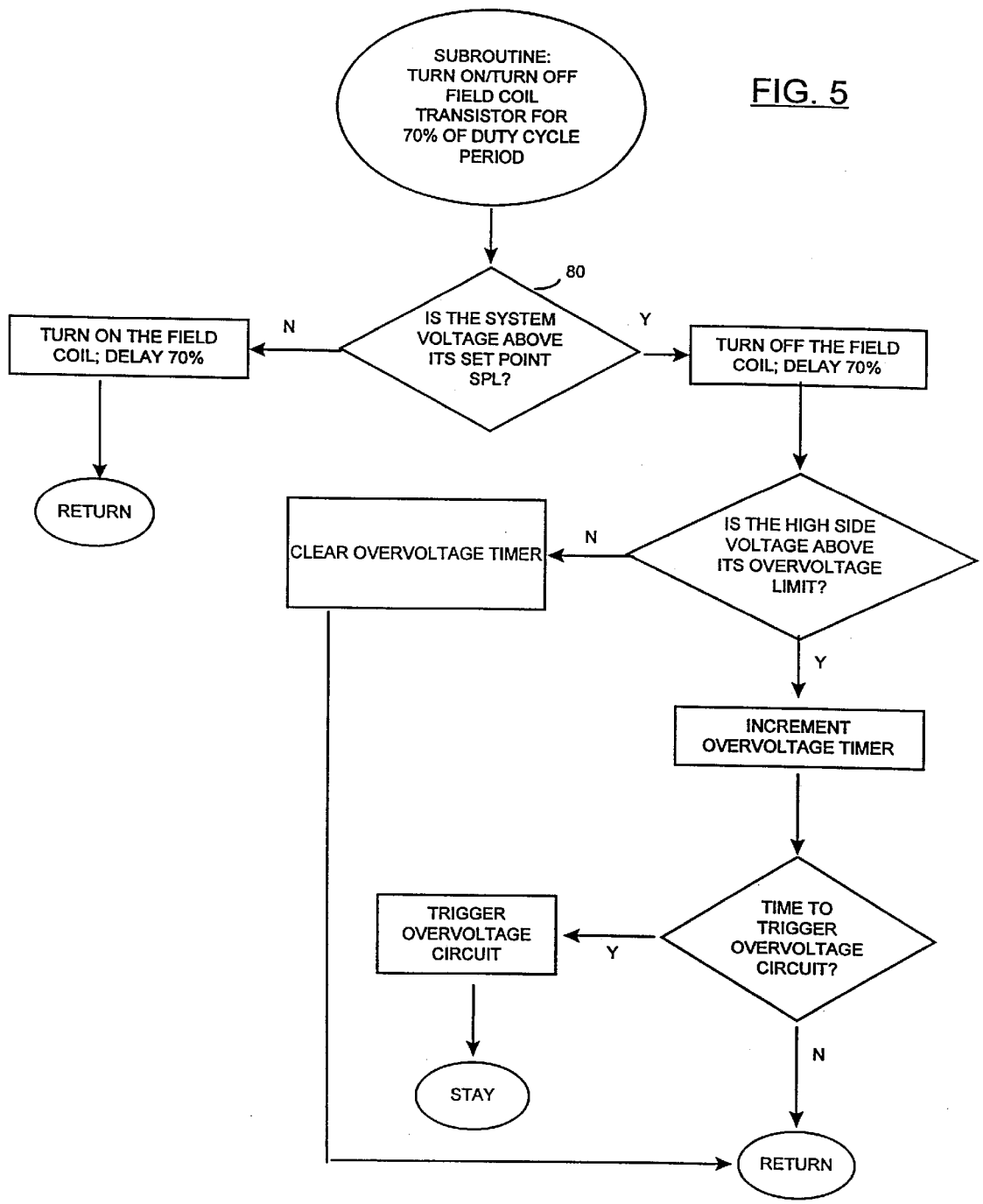

The routine of FIG. 5 then checks in block 80 to determine whether System Voltage is greater than set point SPL. If so, the field coil current is turned off and the routine waits for 5.6 milliseconds. On the other hand, if System Voltage is not greater than SPL, the field coil is turned on and the routine waits for 5.6 milliseconds before returning.

In the event the field coil has been turned off the routine then checks System Voltage against its overvoltage limit. If System Voltage has remained over the overvoltage limit for an excessive time period, the overvoltage circuit is triggered as described above. Otherwise the routine returns.

Returning to FIG. 3, the routine then reads again the low side voltage and re-executes the routine of FIG. 4, as indicated at block 54. Control is then transferred at block 56 to the routine of FIG. 6.

Figure 6:
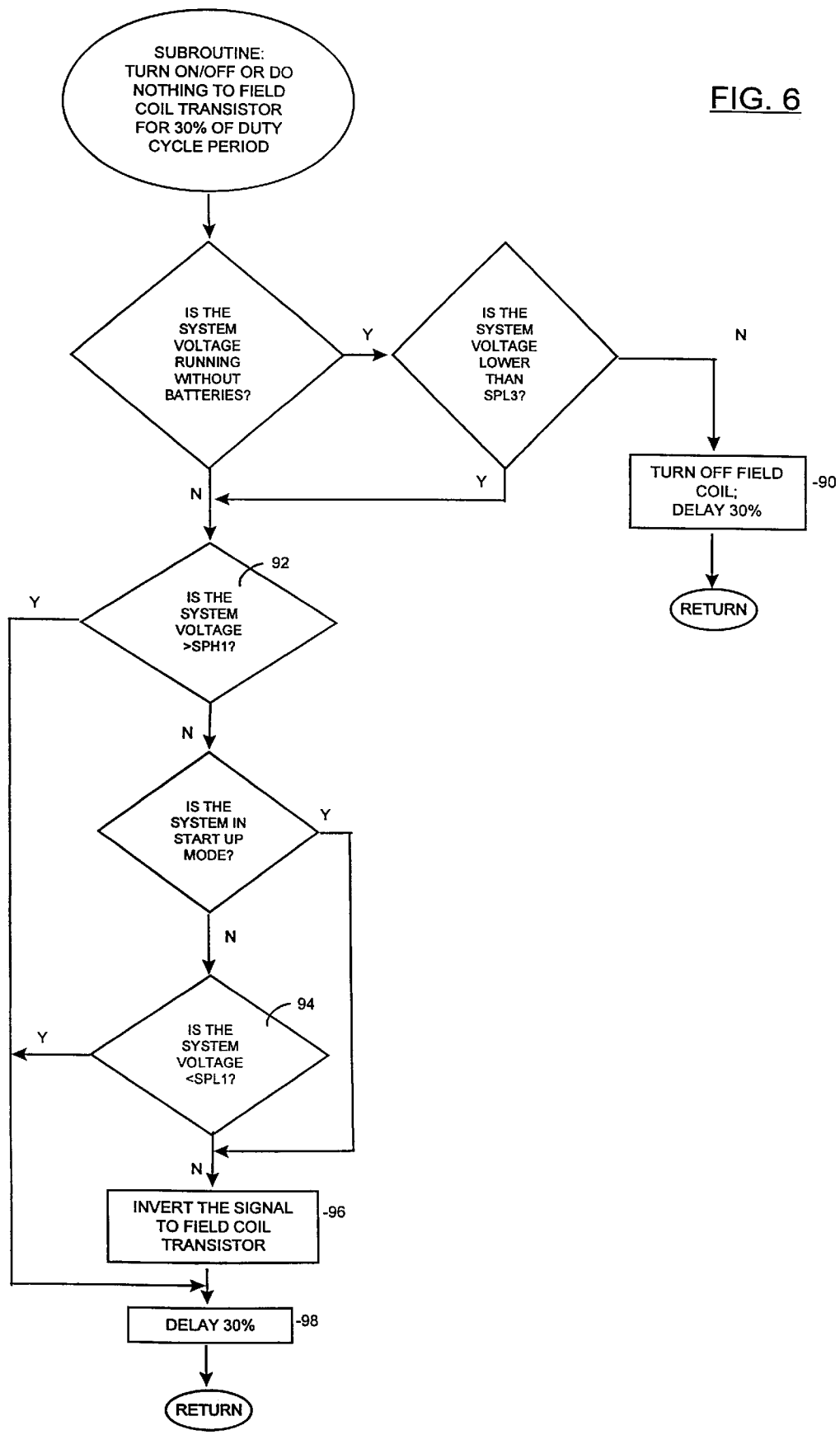

The routine of FIG. 6 controls the field driver transistors 22 to achieve the desired duty cycle. If the system is running without batteries and System Voltage is greater than or equal to SPL3, the system turns off field coil current in block 90, waits for 2.4 milliseconds and returns. In the event the system is running with batteries (or without batteries and System Voltage is lower than SPL3), control is transferred to block 92. In block 92 System Voltage is compared to SPH1. As long as System Voltage is greater than SPH1, the routine delays 2.4 milliseconds in block 98 and then returns. Otherwise, as long as the system is not in the start-up mode, System Voltage is then compared in block 94 to SPL1. As long as System Voltage is less than SPL1, control is again transferred to block 98. Otherwise, the control signal to the field driver transistors 22 of FIG. 1 is inverted in block 96, so that if the field driver transistors were previously conducting they are now made non-conducting and vise versa.

It can be seen that the routines of FIGS. 5 and 6 cooperate to provide one of four separate duty cycles for the field driver transistors 22. The routine of FIG. 5 turns the field driver transistors on or off as appropriate for a time period equal to 70% of the period of the duty cycle (5.6 milliseconds in this example). The routine of FIG. 6 determines the state of conduction of the field driver transistors 22 for the remaining 30% of the duty cycle (2.4 milliseconds in this example), by either turning the field driver transistors off in block 90 or inverting the conduction state of the field coil transistors in block 96. The time periods described above can be adjusted to take into account the execution time of the other routines, which is generally short compared to 5.6 and 2.4 milliseconds.

Figure 8A:
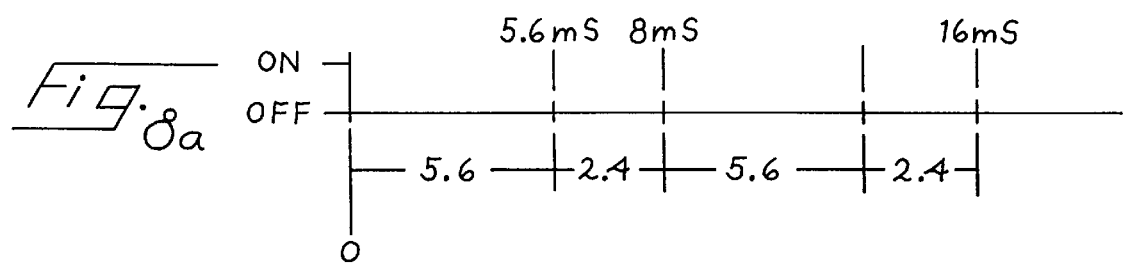
FIGS. 8a–8d are timing diagrams for four field coil transistor duty cycles provided by the regulator of FIG. 1.
Figure 8B:
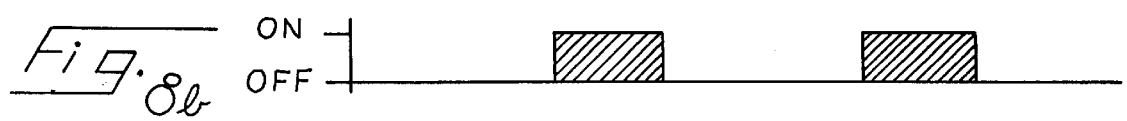
Figure 8C:
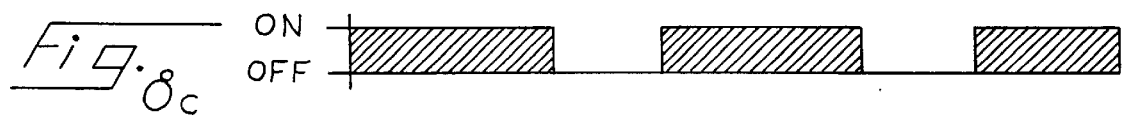
Figure 8D:
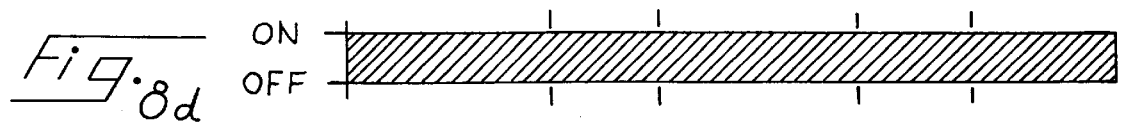

Various combinations of the branchings provided by the routines of FIGS. 5 and 6 provide the four duty cycles shown in FIGS. 8*a* through 8*d*. In FIG. 8*a* the field driver transistors are maintained in the non-conducting state in both the routine of FIG. 5 and the routine of FIG. 6. At the 30% duty cycle as shown in FIG. 8*b*, the field driver transistors are maintained in the non-conducting state by the routine of FIG. 5 for a time of 5.6 milliseconds, and they are then placed in the conducting state for 2.4 milliseconds by the routine of FIG. 6. A 70% duty cycle is obtained as shown in FIG. 8*c* when the field driver transistors are maintained in the on state by the routine of FIG. 5 and the off state by the routine of FIG. 6. Finally, a duty cycle of 100% is obtained as shown in FIG. 8*d* when the field driver transistors are maintained in the on state by both the routines of FIGS. 5 and 6.

The routines of FIGS. 5 and 6 cooperate to generate a switch control signal that controls the field driver transistors and places them in one of four duty cycles (0%, 30%, 70% and 100%). In each case the switch control signal alternates between the on and off states for intermediate duty cycles with a fixed period (about 8 milliseconds in this example). It has been found preferable to provide a small number of intermediate duty cycles in order to reduce hunting problems. In this case two intermediate duty cycles (30% and 70%) are provided; in alternate embodiments up to a total of six discrete duty cycles (four intermediate duty cycles) can be used. Note that it is the micro-controller timing as responsive to the clock signal generator that determines the period of the duty cycles. Thus, delay routines can be used to achieve the desired duty cycles and the need for external, hardware control circuits, such as pulse width modulators, has been eliminated by making more optimal use of basic microcontroller features.

Figure 7:
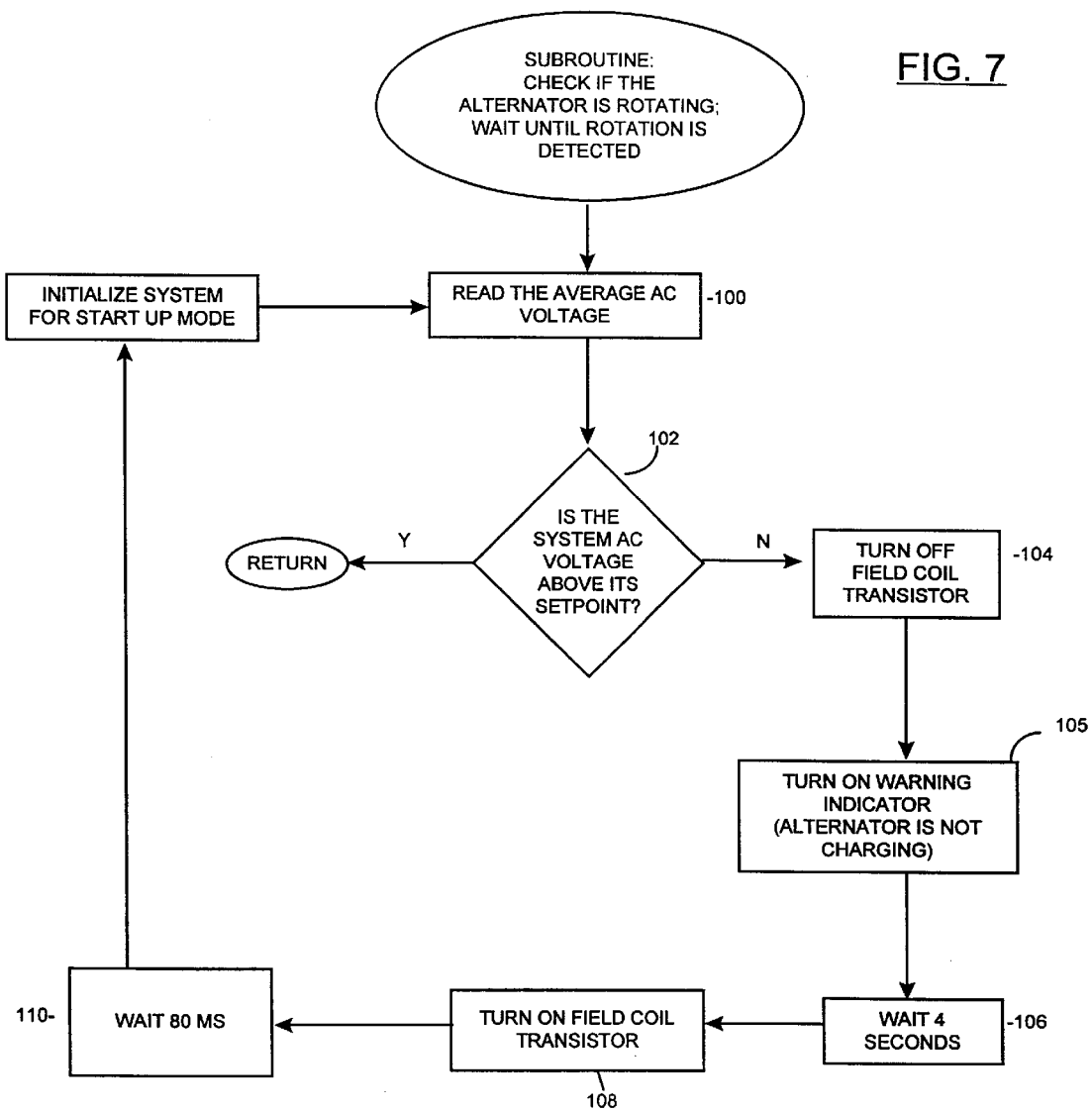

Returning to FIG. 3, control is then transferred at block 58 to the routine of FIG. 7. As shown in FIG. 7, this routine first reads the average AC voltage at block 100, as supplied by the AC Sense circuit of FIG. 1, and then compares this average AC voltage with a set point in block 102. As long as the average AC voltage is above the set point the routine simply returns. An excessively low value of the average AC voltage is taken as an indication that the alternator is not operating properly, typically because it is not rotating. In this case, the field driver transistors 22 of FIG. 1 are turned off in block 104, the warning indicator is turned on to signify that the alternator is not charging in block 105, and the system waits for a set time period such as 4 seconds in block 106. Following this wait, the field driver transistors are turned on in block 108 and the system waits for 80 milliseconds in block 110. The system is initialized for start-up mode before the average AC voltage is again checked in block 100. This cycle repeats until the average AC voltage rises above its set point.

The routine of FIG. 7 monitors the AC voltage supplied by one of the windings W to ensure that current is being generated and that the alternator is rotating. If not, battery power is conserved by turning off field coil current in block 104.

It should be apparent that the routine of FIG. 7 includes a routine 108 that operates as a means for turning on the field coil current and a routine 100, 102 that operates as a means responsive to an AC signal for determining when the AC signal is absent. The routine 104 operates as a means for turning off the field coil current when the AC signal is absent, and the routine 106 operates as a means to return control to the routine of 108, in this case after a delay of four seconds.

Once the routine of FIG. 7 confirms that the alternator is functioning properly, the control is transferred to block 32 in FIG. 3.

The routine of FIG. 3 turns on the warning indicator if any one of a number of non-standard operating conditions is detected. For example, in block 36 the warning indicator is turned on if the temperature exceeds a pre-set limit. Preferably, the warning indicator is activated well before the temperature rises to the point where it may cause shut-down of the electrical supply system. In this way, the operator is provided with warning information that may allow him or her to take corrective action. Similarly, the routine of FIG. 3 turns on the warning indicator in block 40 when the voltage ripple exceeds a preset limit. This is taken as an indication that batteries are not present in the system, and once again the operator is alerted to a non-standard operating condition prior to system failure. Similarly, the routine of FIG. 3 turns on the warning indicator in block 50 if the system voltage is detected as unusually high or unusually low, indicative of a drifting regulated voltage condition. If desired, the warning indicator can take the form of a warning lamp on the instrument panel of the associated vehicle, and the warning lamp may be flashed at a controlled rate to indicate one of these non-standard operating conditions. A flashing warning lamp can then be taken as an indication of a non-standard operating condition which is not sufficiently serious to cause immediate shut-down of alternator operation. If desired, the warning indicator can also take the form of a signal to a vehicle computer that is programmed to display a failure code or to take appropriate action in response to the warning signal. When a flashing visual indicator is used, the flashing rate and/or the flashing sequence can be controlled to identify the particular non-standard operating condition that has triggered the warning.

Microfiche Appendix A provides an assembly language listing of preferred software for the microcontroller 12. This appendix also includes a hardware diagram of the voltage regulator 10 to facilitate use of the software listing. In the event of any discrepancy between Appendix A and the foregoing detailed description, Appendix A is to control. Appendix A is a copyrighted work. Applicant has no objection to third-party facsimile copying of Appendix A as it appears in the records of the U.S. Patent and Trademark Office, but reserves all other copyright rights.

As used herein, the term "generator" is intended broadly to encompass all types of electrical generating devices, including alternators.

The term "routine" is used broadly to encompass any block of software or firmware, whether organized in a contiguous block of code, multiple blocks of code distributed among other software, or subroutines.

The term "function" as used herein is intended broadly. Thus, a first parameter is a function of a second parameter, whether or not the first parameter is a function of additional variables as well.

The term "field coil current parameter" is also intended broadly to encompass parameters that vary as a function of the voltage across the field coil, the field coil duty cycle, or other measures of the strength of the magnetic field created by the field coil.

Of course, it should be understood that the systems described above represent only a few of the many forms that the present invention can take. For example, the functions described above can readily be adapted for a single-voltage alternator, and all of the specific control functions can be adapted as appropriate for a particular alternator. It is therefore intended that this detailed description be regarded as illustrative and not as limiting. It is only the following claims, including all equivalents, that are intended to define the scope of this invention.

I claim:

1. In a voltage regulator for a generator comprising a field coil and a stator winding, said stator winding generating an AC signal when the generator is generating current, a system for controlling field coil current comprising:

first means for turning on current through the field coil;

second means, responsive to the AC signal, for determining when the AC signal is absent;

third means for turning off current through the field coil in response to a determination by the second means that the AC signal is absent; and fourth means, operative after the third means has turned off current through the field coil, for transferring control to the first means after a delay;

said first, second, third and fourth means cooperating to turn on current through the field coil intermittently during a time period when the AC signal is absent.

2. In a voltage regulator for a generator comprising a field coil and a stator winding, said stator winding generating an AC signal when the generator is generating current, a system for controlling field coil current comprising:

a micro-controller;

a first routine, executed by the micro-controller, operative to turn on current through the field coil;

a second routine, executed by the micro-controller after the first routine, operative to determine when the AC signal is absent;

a third routine, executed by the micro-controller after the second routine, operative to turn off current through the field coil in response to a determination by the second routine that the AC signal is absent; and a fourth routine, executed by the micro-controller after the third routine has turned off current through the field coil, to transfer control to the first routine after a selected delay;

said first, second, third and fourth routines cooperating to turn on current through the field coil intermittently during a time period when the AC signal is absent.

3. In a voltage regulator for a generator comprising a field coil, said voltage regulator comprising a field coil switch operative to control current flow through the field coil and a digital processor coupled to the field coil switch, the improvement comprising:

a software routine included in the digital processor and operative to generate a switch control signal constrained to one of no more than about 6 and no fewer than 3 discrete duty cycle levels, said switch control signal having a substantially constant period at intermediate duty cycle levels, said field coil switch responsive to the switch control signal.

4. The invention of claim 3 wherein the digital processor comprises a clock signal generator, and wherein said software routine relies on the clock signal generator to maintain the substantially constant period of the switch control signal.

5. The invention of claim 3 wherein the software routine comprises at least one delay routine which causes selected delays, and wherein the duty cycle varies as a function of said selected delays.

6. The invention of claim 3 wherein the software routine constrains the duty cycle to four discrete duty cycle levels.

7. The invention of claim 6 wherein the four discrete duty cycle levels are substantially equal to 0%, 30%, 70% and 100%, respectively.

8. In a voltage regulator for a generator comprising a field coil, said voltage regulator comprising a field coil switch operative to control current flow through the field coil and a digital processor coupled to the field coil switch, the improvement comprising:

means, included in the digital processor, for switching the field coil switch on and off with a variable duty cycle, said duty cycle constrained to one of no more than about 6 and no fewer than 3 discrete levels.

9. The invention of claim 8 wherein the digital processor comprises a clock signal generator, and wherein the switching means relies on the clock signal generator to maintain a substantially constant period at intermediate duty cycles.

10. The invention of claim 8 wherein the switching means comprises at least one delay routine that causes selected delays, and wherein the duty cycle varies as a function of said selected delays.

11. The invention of claim 8 wherein the switching means constrains the duty cycle to four discrete duty cycle levels.

12. The invention of claim 11 wherein the four discrete duty cycle levels are substantially equal to 0%, 30%, 70% and 100%, respectively.

13. In an electrical supply system comprising a generator and a voltage regulator coupled to the generator, the improvement comprising:

means, included in the voltage regulator, for generating a warning signal in response to detection of an excessively high temperature condition.

14. The invention of claim 13 wherein the warning signal comprises a flashing visual indicator.

15. In an electrical supply system comprising a generator and a voltage regulator coupled to the generator, the improvement comprising:

a microcontroller included in said voltage regulator, said microcontroller comprising a software routine responsive to an excessively high temperature condition to generate a warning signal prior to failure of the electrical supply system.

16. The invention of claim 15 wherein the warning signal comprises a flashing visual indicator.

17. In a voltage regulator for a generator comprising a field coil and a stator winding, said stator winding generating an AC signal when the generator is generating current, a system for controlling field coil current comprising:

first means for intermittently turning on current through the field coil when the AC signal is absent; and means for transferring to normal operation when the AC signal is present.

* * * * *